United States Patent [19]

Shipman

[11] 4,211,825
[45] Jul. 8, 1980

[54] MULTILAYER COMPOSITE FILMS AND METHOD OF MANUFACTURE THEREOF

[75] Inventor: Gene H. Shipman, Cottage Grove, Minn.

[73] Assignee: Minnesota Mining and Manufacturing Company, St. Paul, Minn.

[21] Appl. No.: 951,597

[22] Filed: Oct. 16, 1978

[51] Int. Cl.² .................... B32B 27/06; B32B 27/36
[52] U.S. Cl. .................................... 428/483; 428/461; 428/420; 428/516; 156/272
[58] Field of Search ............. 428/420, 480, 483, 500, 428/515, 516; 156/272

[56] References Cited

U.S. PATENT DOCUMENTS

| | | | |
|---|---|---|---|
| 3,188,265 | 6/1965 | Charbonneau | 428/420 |
| 3,989,778 | 11/1976 | Osborne | 156/272 |
| 3,997,385 | 12/1976 | Osborne | 156/272 |
| 4,022,646 | 5/1977 | Casey | 428/516 |

*Primary Examiner*—George F. Lesmes
*Assistant Examiner*—E. Rollins Buffalow
*Attorney, Agent, or Firm*—Cruzan Alexander; Donald M. Sell; James V. Lilly

[57] ABSTRACT

A multilayer composite film structure comprising (i) a support of polyester film, (ii) a first layer of organic polymer having a mass crystallinity of less than about 60%, and (iii) a second layer of organic polymer having a mass crystallinity of greater than about 60% is provided. A method for non-adhesively bonding normally non-bondable polymeric materials to polyester is also provided.

13 Claims, 2 Drawing Figures

MULTILAYER COMPOSITE FILMS AND METHOD OF MANUFACTURE THEREOF

BACKGROUND OF THE INVENTION

This invention relates to composite film materials and methods for their preparation. More particularly it relates to composite films and methods of manufacture wherein highly crystalline polymeric materials (e.g., those having a mass crystallinity greater than about 60%) are non-adhesively bonded to polyester film, even though said polymeric materials have heretofore been essentially non-bondable to polyester. As used herein the term "mass crystallinity" means the mass fraction (in percent) of a material that is crystalline (Encyclopedia of Polymer Science and Technology, Vol. 4, pp 472 (1966).

Multilayer composite film structures which employ non-adhesive bonding of their various layers are known. Thus see U.S. Pat. Nos. 3,188,265 and 3,188,266. These patents describe two layer composite film structures having a polyester film layer and a polyethylene film layer. The structures are prepared by laminating the two film layers together heating and then irradiating the laminate with electromagnetic radiation (e.g., ultraviolet light) in the wavelength range of about 1800–4000 angstroms. After irradiation the two layers are self-unified and are not mechanically separable from each other.

U.S. Pat. No. 3,188,266 further discloses that a third layer may be incorporated into the composite structure. The third layer comprises a solid body which has one of its surfaces adherently bonded to the polyethylene layer. The resulting structure can then be employed in an adhesive tape or sheet, a coated abrasive, a coated fabric or other coated or laminated polymer construction.

While the two and three layer constructions disclosed in these patents have proven to be useful in bonding polymers having a mass crystallinity of less than about 60% to polyester, it was discovered that those polymeric materials having a mass crystallinity of more than about 60% (sometimes referred to hereinafter as highly crystalline materials) did not form strong bonds to polyester when bonded by the technique described therein.

Consequently other techniques were employed in order to bond these materials to polyester. These techniques included, for example, either (i) priming the polyester surface or (ii) treating the polyester surface with corona discharge before joining the two materials together. They also included the use of adhesives to bond the materials to each other. However, none of these techniques has proven entirely satisfactory. Often the resulting bond between the materials was not very strong with the result that they frequently delaminated under even minimal stress conditions.

Additionally these techniques required the use of special equipment and/or processing steps. Still further the primers and adhesives often contained solvents which presented environmental, health and safety problems.

Moreover, the utility of certain of these composite film structures was limited. Such structures are often used in food packaging. Thus migrating solvents present in the primers and adhesives were undesirable. If the solvents could be removed from such composite structures, however, then the potential health and safety problems attendant with their use would be eliminated.

Coextrusion techniques have also been employed to bond highly crystalline materials to polyester. In such techniques, the two polymers are coextruded onto each other and the two layer structure then irradiated with ultraviolet light. However, the two layers typically have not adhered well to each other.

THE PRESENT INVENTION

It has now been discovered that highly crystalline polymers can be non-adhesively bonded to polyester to form multilayered composite films. This result is achieved by utilizing an intermediate or first polymeric layer between a polyester support and an outer or second layer of highly crystalline material. The resulting films are resistant to delamination as exemplified by the strength of the interfacial bonds therebetween. That is, the interfacial bond between the support and the first layer is so strong that the two layers require more than about 90 grams per centimeter of width (g/cm width) tensile stress before they are mechanically separable. The interfacial bond between the first layer and the second layer is even stronger. Thus the bond between these two layers cannot be mechanically broken.

The composite films of the invention also eliminate the need for primers, solvents, adhesives and corona discharge preparation techniques. They are easily prepared and eliminate the environmental, health and safety hazards which may be associated with said primers, etc.

The films of the invention also exhibit excellent resistance to greases such as animal, vegetable and mineral oils, and improved resistance to the passage of gasses such as water vapor, oxygen, nitrogen, carbon dioxide, etc. than do the aforementioned prior art composite films.

In accordance with the present invention there is provided a multilayer composite film structure comprising a support of polyester film;

a first layer on said support, said first layer comprising an organic polymer which is transparent to electromagnetic radiation in the wavelength range of about 1800 to 4000 angstroms and whose skeletal chain substantially comprises saturated carbon-to-carbon linkages and has a mass crystallinity of less than about 60%, and wherein when said support and said first layer are placed in face-to-face contact with each other, heated and irradiated with said electromagnetic radiation, said support and said first layer form an interfacial bond to each other which has bond strength of at least about 90 g/cm width; and a second layer on said first layer, said second layer comprising an organic polymer which is transparent to said electromagnetic radiation and has a mass crystallinity of greater than about 60%; and wherein when said first and second layers are placed in face-to-face contact with each other and heated, said first and second layers form an interfacial bond to each other which is so strong that said layers cannot be mechanically separated from one another.

Also provided herein is a novel method of preparing the composite film structures of the invention.

The composite film structures of the present invention are particularly useful as packaging materials especially those which undergo processing at elevated temperatures (e.g., greater than 100° C.) and/or elevated pressures (e.g., greater than 1 atmosphere). Such materials include packages for foods (e.g., frozen vegetables, etc.) and medical instruments. Additionally the film structures of the present invention are permanently heat sealable to various materials including, for example, high density (i.e., $\rho$ greater than about 0.94 g/cm$^3$) polyethylene.

BRIEF DESCRIPTION OF THE DRAWING

The invention is described in more detail hereinafter with reference to the accompanying drawings wherein like reference characters refer to the same parts throughout the several views and in which.

DETAILED DESCRIPTION OF THE INVENTION

Figure 1:
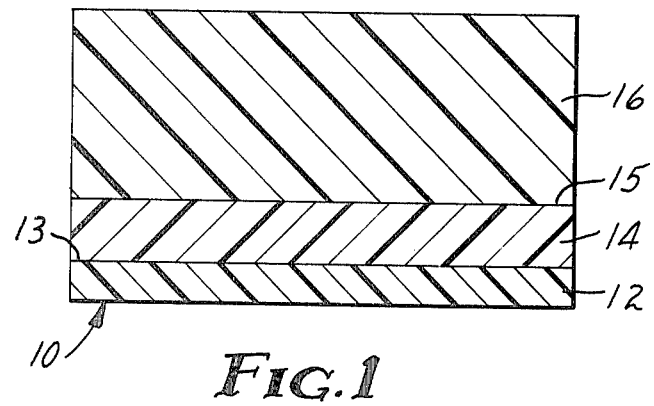
FIG. 1 shows a side view of one embodiment of the composite film structure of the invention.

Referring now specifically to FIG. 1, the multilayered composite film structure 10 comprises a polyester support 12, a first layer 14 and a second layer 16. The first layer 14 is in intimate face-to-face contact with both support 12 and second layer 16 and forms strong interfacial bonds with each.

The support 12 comprises a polyester film. Preferably said film is biaxially oriented and heat-set and is at least about 10 microns thick most preferably it comprises poly(ethylene terephthalate). However, other polyesters such as poly(1,4-cyclohexylenedimethylene terephthalate) and poly(ethylene naphthalate), may make up the support 12.

The material used in support 12 may be prepared from the reaction of the appropriate dicarboxylic acid with ethylene glycol. Alternatively the acid may be converted to the ester and then allowed to react with the glycol by ester interchange. Generally, the amount of glycol employed is in excess to the stoichiometric amount required to react with acid. Minor amounts (e.g., up to 10 mole percent) of other dicarboxylic acids such as isophthalic, phthalic, 2,5-or 2,7-naphthalenedicarboxylic, succinic, sebacic, adipic, azelaic, suberic, pimelic, glutaric, etc., or a diester thereof may be substituted for the acid without deleteriously affecting the properties of the resultant polyester. Additionally, minor amounts (e.g., up to 10 mole percent) of other glycols such as 1,3-propanediol, 1,4-butanediol etc. may be substituted for the ethylene glycol.

The thickness of support 12 is not critical to the present invention. However, preferably support 12 is at least about 0.00125 cm thick.

First layer 14 comprises an organic polymer whose skeletal chain substantially comprises saturated carbon-to-carbon linkages. Additionally, this organic polymer is not highly crystylline (i.e., it has a mass crystallinity of less than about 60%) and is transparent to electromagnetic radiation in the wavelength range of about 1800 to 4000 angstroms. Preferably the polymer is branched although a linear polymer is also useful. It is also preferred that the polymer used in layer 14 contain a maximum of about 0.01 percent by weight antioxidant and slip agent.

Preferably the organic polymer used in layer 14 is selected from the group consisting of polyethylene; copolymers of ethylene and (i) acrylic acid, (ii) ethyl acrylate and (iii) vinyl acetate; and terpolymers of ethylene, methacrylic acid and vinyl acetate.

Particularly preferred materials for use as layer 14 are the low density (i.e., $\rho$ of less than about 0.925 g/cm$^3$) and medium density (i.e., $\rho$ in range of about 0.925 to 0.94 g/cm$^3$) polyethylenes. A specific example of one useful low density polyethylene is Union Carbide Corporation type DFD 3300 polyethylene. A specific example of one useful medium density polyethylene is Gulf Chemical Company type 2604M polyethylene.

Other representative examples of materials useful as layer 14 are the copolymers of ethylene and acrylic acid such as type 2735.12 commercially available from the Dow Chemical Company; metal salt copolymers of ethylene and acrylic acid such as "Surlyn-A" commercially available from the E. I. duPont de Nemours and Company; and terpolymers of ethylene, methacrylic acid and vinyl acetate such as the "Elvax" acid terpolymer resins commercially available from E. I. duPont de Nemours and Company.

The thickness of layer 14 is not critical to the present invention. Typically the thickness of said layer is in the range of about 0.00125 to 0.005 cm thick. Preferably the thickness of said layer is in the range of about 0.00125 to 0.0025 cm thick. Most preferably the thickness of said layer is about 0.0025 cm thick.

Layer 16 of the composite film structure of the invention comprises a highly crystalline polymeric material. This material has a mass crystallinity of at least about 60% and is transparent to electromagnetic radiation in the wavelength range of about 1800 to 4000 Angstroms.

Preferably the materials employed in layers 14 and 16 are mutually compatible and exhibit a similar melt index. Thus, it is preferred that the materials of these two layers have a melt index in the range of about 2 to 5 g/10 min. Moreover, it is preferred that these materials each be extrusion coatable.

A particularly useful material for use in layer 16 is high density polyethylene (i.e., $\rho$ of at least about 0.94 g/cm$^3$). These polyethylenes do not form strong interfacial bonds to polyester when bonded thereto by prior art techniques. Representative examples of commercially available high density polyethylenes include types 5320.03 and 5320.12 polyethylene available from the Dow Chemical Company and types DPD 7070, DMDJ 7006 and DMDJ 7904 polyethylene available from the Union Carbide Corporation.

The thickness of layer 16 is not critical to the present invention. Typically the thickness of said layer is in the range of 0.00125 to 0.0075 cm. Preferably the thickness of said layer is in the range of about 0.00125 to 0.0025 cm. Most preferably the thickness of said layer is about 0.0025 cm.

The composite films of the invention may be prepared by a number of techniques. Thus, for example, one may (i) coextrude layer 16 with layer 14 and then coextrude the combination onto support 12 (ii) heat the composite structure for about 10 seconds at to about 130° C. and (iii) irradiate interfacial area 13 with electromagnetic radiation (e.g., ultraviolet light) in the wavelength range of about 1800 to 4000 angstroms. Irradiation of interfacial area 13 is accomplished by irradiating composite 10 through layers 14 and 16. The irradiation and heating steps are of an intensity and for a time sufficient to provide an interfacial bond strength between support 12 and layer 14 of at least about 90 g/cm or width. The other interfacial bond (i.e., that between layer 14 and layer 16), on the other hand, is so strong that layers 14 and 16 cannot thereafter be mechanically separated.

The length of time which the composite must be irradiated is dependent upon the light source utilized and distance that the composite is from said source. One particularly useful set of irradiation conditions comprise irradiating the composite for about 10 seconds at a distance of from 3 to 5 centimeters from a model G25T8, 25 watt germicidal ultra-violet light commercially available from the General Electric Company. The process for irradiation with ultraviolet light is described in more detail in U.S. Pat. No. 3,188,266 at column 5, lines 1 to 60, incorporated herein by reference.

Other methods of preparing the composite are also useful. Thus the layer 14 can be applied to support 12 (e.g., by extrusion, coextrusion or solvent coating techniques) and this structure heated and irradiated as described above. Layer 16 may then be applied to layer 14 and heated as described above. Still other methods of preparation are possible as will be apparent from this disclosure.

Figure 2:
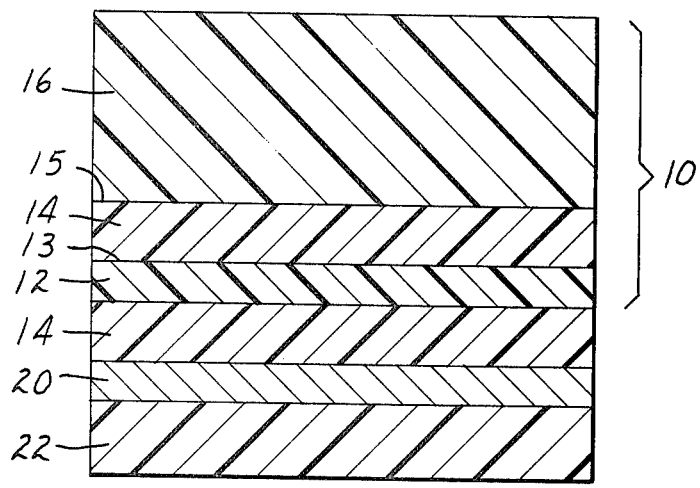
FIG. 2 shows a modification of the composite film structure of FIG. 1.

The multilayer composite film structure of the present invention may be employed as such, or alternatively, it may be further modified. Thus, referring specifically to FIG. 2, there is shown a modification of multilayer composite structure 10 wherein another layer 14 has been applied to the opposite side of support 12. The interfacial area of the other layer 14 and support 12 has been exposed to heat and electromagnetic radiation as described above. The resulting four layered structure is then laminated to a metalized polyester comprising a layer 20 of aluminum and a layer 22 of poly(ethylene terephthalate) to produce a six layered finished product.

The present invention is further exemplified by the following examples wherein the stated melt indices of the polymers were determined according to ASTM D1238.

EXAMPLES 1-5

Composite film structures according to the present invention were prepared by coextrusion techniques. Each composite structure consisted of, in order, a support of biaxially oriented and heat-set poly(ethylene terephthalate) (0.0013 cm thick), a 0.0025 cm thick first layer of a low density ($\rho$=0.918 g/cm$^3$) polyethylene having a mass crystallinity less than about 60% and being commercially available from the Union Carbide Corporation as DFD 3300 (melt index of 3.5 g/10 min) and a 0.00635 cm thick second layer of high density polyethylene having a mass crystallinity of more than about 60%. The resulting film structures were heated to about 130° C. and exposed to electromagnetic radiation in the wavelength range of from about 1800 to 4000 angstroms for about 10 seconds. A Model G25T8, 25 watt germicidal ultraviolet light commercially available from the General Electric Company was used for the irradiation. It was located about 4 centimeters from the composite film structure.

The strength of (i) the interfacial bond between the support and the first layer (i.e., the first interfacial bond) and (ii) the interfacial bond between the first layer and the second layer (i.e., the second interfacial bond) of the resulting composites was determined. The test for determining the bond strength involved immersing about 1.25 cm of one end of each sample into an aqueous solution of NH$_4$OH (58% by weight) for 24 hours at about 20° C. This caused the first interfacial bond to separate in the immersed area but did not affect the second interfacial bond (e.g., there was no separation of this bond). The second interfacial bond could not be mechanically separated.

The tensile strength of the first interfacial bond was then determined on an Instron tensile tester Model TM available from the Instron Corporation of Canton, Massachussetts. A 2.5 cm wide by 15 cm long specimen was cut from each of the composite films to be tested. The portion of the support which had separated from the first layer was inserted into one of the jaws of the tester and the portion of the first layer plus second layer which had separated from the support was inserted into the other jaw of the tester. The jaws were then pulled away from each other at a speed of 12.5 cm/min and the maximum force necessary to separate the bond recorded. The results of these tests together with the materials (and some of their characteristics) used as the second layer are set forth in Table 1. In each case the interfacial bond strength of the bond between the first layer and the support had a value of greater than about 90 g/cm width.

TABLE 1

| EXAMPLE | FIRST INTERFACIAL BOND STRENGTH (g/cm width) | MANUFACTURER & TYPE | DENSITY (g/cm$^3$) | SECOND LAYER MELT INDEX (g/10 min) | SECOND INTERFACIAL BOND STRENGTH (g/cm width) |
|---|---|---|---|---|---|
| 1 | 142 | Dow Chemical Company Type 5320.03 | 0.954 | 8.0 | Mechanically inseparable |
| 2 | 134 | Union Carbide Corporation Type DMDJ 7006 | 0.962 | 6.0 | Mechanically inseparable |
| 3 | 143 | Union Carbide Corporation Type DPD 7070 | 0.942 | — | Mechanically inseparable |
| 4 | 116 | Union Carbide Corporation Type DMDJ 7904 | 0.953 | 4.0 | Mechanically inseparable |
| 5 | 134 | Dow Chemical Company Type 5320.12 | 0.950 | 12.0 | Mechanically inseparable |

EXAMPLES 6-9

Composite film structures according to the present invention were prepared as described in Examples 1-5. In Examples 6 and 7 the first layer comprised a medium density polyethylene ($\rho$=0.934 g/cm$^3$, melt index of 1.0 g/10 min.) having a mass crystallinity of less than about 60% and being commercially available from the Gulf Chemical Company as type 2604 M. In Examples 8 and 9 the first polymeric material was a copolymer of ethylene and acrylic ($\rho$=0.938 g/cm$^3$, melt index of 5.5 g/10 min) and having a mass crystallinity of less than about 60% and being commercially available from the Dow Chemical Company as type 2375.12. In all cases the second layer comprised a high density polyethylene having a mass crystallinity of more than about 60%.

The strength of the two interfacial bonds was determined according to the procedure set forth in Examples 1–5. The results of these tests together with the materials (and some of their characteristics) used as the second layer are set forth in Table 2.

EXAMPLES 14–15

The following examples illustrate the improved resistance of the composite films of the invention to moisture vapor transmission and oxygen transmission. Composite film structures were prepared as described in Examples 1–9. In Example 14 the composite film structure comprised a 0.0013 cm thick support of poly(ethylene terephthalate), a 0.004 cm thick first layer of medium den-

TABLE 2

| EXAMPLE | FIRST INTERFACIAL BOND STRENGTH (g/cm width) | MANUFACTURER & TYPE | DENSITY (g/cm$^3$) | SECOND LAYER MELT INDEX (g/10 min) | SECOND INTERFACIAL BOND STRENGTH (g/m width) |
|---|---|---|---|---|---|
| 6 | 125 | Dow Chemical Company Type 5320.03 | 0.954 | 8.0 | Mechanically Inseparable |
| 7 | 89–107 | Union Carbide Corporation Type DMDJ 7904 | 0.953 | 4.0 | Mechanically Inseparable |
| 8 | 169 | Union Carbide Corporation Type DMDJ 7904 | 0.953 | 4.0 | Mechanically Inseparable |
| 9 | 107 | Dow Chemical Company Type 5320.12 | 0.950 | 12.0 | Mechanically Inseparable |

EXAMPLES 10–13

The following examples demonstrate the inability of high density polyethylene to form a strong interfacial bond to polyester when no first layer is employed therebetween. In these examples, film structures were prepared by extrusion coating a layer (0.0089 cm thick) of high density polyethylene having a degree of crystallinity greater than about 60% onto a support layer (0.0013 cm thick) of biaxially oriented and heat-set poly(ethylene terephthalate). The resulting film structures were heated to 130° C. and exposed to electromagnetic radiation in the wavelength range of from about 1800 to 4000 angstroms as described in Examples 1–9.

The strength of the interfacial bond between the layer of high density polyethylene and the support of poly(ethylene terephthalate) was determined as described in Examples 1–9. The results of these tests together with the nature of the high density polyethylene (and some of their properties) used are set forth in Table 3. In each case the tensile strength of the bond between the high density polyethylene layer and the poly(ethylene terephthalate) support had a value of less than about 90 g/cm of width. Moreover each of these bonds readily delaminated at the interfacial bond when subjected to the test.

TABLE 3

| Ex. | Interfacial Bond Strength (g/cm width) | Manufacturer & Type | Density (g/cm$^3$) | Melt Index (g/10) min |
|---|---|---|---|---|
| 10 | 17.9 | Dow Chemical Company Type 5320.03 | 0.954 | 8 |
| 11 | 10.7 | Union Carbide Corporation Type DPD 7070 | 0.942 | — |
| 12 | 17.9 | Union Carbide Corporation Type DMDJ 7904 | 0.953 | 4 |
| 13 | 71.4 | Dow Chemical Company Type 5320.12 | 0.950 | 12 | sity polyethylene (type 2604M, $\rho$ of 0.934 g/cm$^3$, 1.0 g/10 min melt index, commercially available from Gulf Chemical Company), and a 0.0017 cm thick second layer of high density polyethylene ($\rho$ of 0.954 g/cm$^3$, 8.0 g/10 min melt index, commercially available from the Dow Chemical Company). This was an example of the invention.

In Example 15 the composite film structure comprised a 0.0013 cm thick support of poly(ethylene terephthalate) and a 0.0019 cm thick layer of medium density polyethylene (Gulf type 2604M). This was an example of a prior art composite film. The results of the tests are given in Table 4.

As can be seen the composite films of the invention are more resistant to the passage of water vapor and oxygen.

TABLE 4

| Example | Moisture Vapor Transmission (g/m$^2$/24 hour) | Oxygen Transmission (cc/m$^2$/24 hour atm) |
|---|---|---|
| 14 | 4.8 | 8.1 |
| 15 | 6.2 | 11.2 |

What is claimed is:

1. A multilayer composite film structure comprising a support of polyester film;
   a first layer on said support, said first layer comprising a polyolefin which is transparent to electromagnetic radiation in the wavelength range of about 1800 to 4000 angstroms and has a mass crystallinity of less than about 60% and a density less than about 0.94 g/cm$^3$; and wherein said support and said first layer have been placed in face-to-face contact with each other and heated and irradiated with said electromagnetic radiation to form a bond to each other which has an interfacial bond strength of at least about 90 grams per centimeter of width; and
   a second layer on said first layer, said second layer comprising a polyolefin which is transparent to said electromagnetic radiation and has a mass crystallinity of greater than about 60% and a density greater than about 0.94 g/cm$^3$; and wherein said first and second layers have been placed in face-to-face contact with each other and heated to form an interfacial bond to each other which is so strong that said layers cannot be mechanically separated from one another.

2. A multilayer composite film structure in accordance with claim 1 wherein said first layer is selected from the group consisting of polyethylene, copolymers of ethylene and (i) acrylic acid, (ii) ethyl acrylate and (iii) vinyl acetate, and terpolymers of ethylene, methacrylic acid and vinyl acetate.

3. A multilayer composite film structure in accordance with claim 1 wherein said first layer is polyethylene.

4. A multilayer composite film structure in accordance with claim 3 wherein said polyethylene has a density in the range of about 0.925 to 0.94 g/cm$^3$.

5. A multilayer composite film structure in accordance with claim 3 wherein said polyethylene has a density of less than about 0.925 gm/cm$^3$.

6. A multilayer composite film structure in accordance with claim 1 wherein said second layer is selected from polyethylene having a density greater than about 0.94 g/cm$^3$.

7. A multilayer composite film structure in accordance with claim 1 wherein said support comprises poly(ethylene terephthalate).

8. A multilayer composite film structure according to claim 1 wherein said support comprises biaxially oriented and heat-set poly(ethylene terephthalate);
said first layer comprises polyethylene; and
said second layer comprises polyethylene.

9. A multilayer composite film structure in accordance with claim 8 wherein said first layer comprises polyethylene that has a density of less than about 0.025 g/cm$^3$.

10. A multilayer composite film structure in accordance with claim 8 wherein said first layer comprises polyethylene that has a density of less than about 0.925 g/cm$^3$.

11. A multilayer composite film structure in accordance with claim 8 wherein said support is at least about 0.00125 cm thick, said first layer is from about 0.00125 to 0.005 cm thick and said second layer is from about 0.00125 to 0.0075 cm thick.

12. A multilayer composite film structure in accordance with claim 11 wherein said support is about 0.00125 cm thick, said first layer is about 0.0025 cm thick and said second layer is about 0.0025 cm thick.

13. A method of forming a multilayer composite film structure comprising the steps of:
placing a support of polyester film and a first layer of a polyolefin which is transparent to electromagnetic radiation in the wavelength range of about 1800 to 4000 angstroms and which has a mass crystallinity of less than about 60% and a density less than about 0.94 g/cm$^3$ in face-to-face contact with each other to provide a first interfacial area;
placing said first layer and a second layer of a polyolefin which is transparent to said electromagnetic radiation and has a mass crystallinity greater than about 60% and a density greater than about 0.94 g/cm$^3$ in face-to-face contact with each other to provide a second interfacial area;
heating and irradiating said first interfacial area with said electromagnetic radiation at an intensity and for a time sufficient to provide an interfacial bond between said support and said first layer, said bond having an interfacial bond strength of at least about 90 grams per centimeter of width; and
heating said second interfacial area to a temperature and for a time sufficient to provide an interfacial bond between said first and second layers which is so strong that said first and second layers cannot be mechanically separated from one another.

* * * * *

UNITED STATES PATENT AND TRADEMARK OFFICE
CERTIFICATE OF CORRECTION

PATENT NO. : 4,211,825
DATED : July 8, 1980
INVENTOR(S) : GENE H. SHIPMAN

It is certified that error appears in the above—identified patent and that said Letters Patent are hereby corrected as shown below:

Column 4, line 65, change "or" to --of--.

Column 5, line 62, delete the = sign between the greek letter "$\rho$" and "0.918".

Change Claim 9 to read the following:

A multilayer composite film structure in accordance with claim 8 wherein said first layer comprises polyethylene that has a density in the range of about 0.925 g/cm$^3$ to 0.94 g/cm$^3$.

Signed and Sealed this

Twenty-third Day of December 1980

[SEAL]

Attest:

SIDNEY A. DIAMOND

Attesting Officer

Commissioner of Patents and Trademarks